(12) United States Patent
Powell et al.

(10) Patent No.: US 8,910,871 B1
(45) Date of Patent: Dec. 16, 2014

(54) BARCODE READER THAT READS ELECTRONICALLY DISPLAYED BARCODES DIFFERENTLY THAN PHYSICALLY PRINTED BARCODES

(75) Inventors: George Powell, Sandy, UT (US); Ryan Hoobler, Salt Lake City, UT (US); Ming Lei, Princeton Junction, NJ (US); Garrett Russell, Phoenixville, PA (US); Mark Ashby, Taylorsville, UT (US)

(73) Assignee: The Code Corporation, Draper, UT (US)

( * ) Notice: Subject to any disclaimer, the term of this patent is extended or adjusted under 35 U.S.C. 154(b) by 327 days.

(21) Appl. No.: 13/460,530

(22) Filed: Apr. 30, 2012

(51) Int. Cl.
*G06K 7/10* (2006.01)

(52) U.S. Cl.
USPC .................................. 235/462.07; 235/462.41

(58) Field of Classification Search
USPC ............................ 235/462.07, 462.41, 462.42
See application file for complete search history.

(56) References Cited

U.S. PATENT DOCUMENTS

| | | | | |
|---|---|---|---|---|
| 5,418,357 | A * | 5/1995 | Inoue et al. | 235/462.11 |
| 5,635,700 | A * | 6/1997 | Fazekas | 235/462.06 |
| 7,934,641 | B2 * | 5/2011 | Melick et al. | 235/375 |
| 8,662,397 | B2 * | 3/2014 | Carlson et al. | 235/462.32 |
| 2003/0080189 | A1 * | 5/2003 | Patel et al. | 235/454 |
| 2013/0062412 | A1 * | 3/2013 | Tan et al. | 235/455 |

* cited by examiner

*Primary Examiner* — Ahshik Kim
(74) *Attorney, Agent, or Firm* — Timothy P. O'Hagan; Austin Rapp & Hardman

(57) ABSTRACT

A barcode reader includes a first set of characteristics that are optimized for reading an electronically displayed barcode. The barcode reader also includes a second set of characteristics that are optimized for reading a physically printed barcode. The first set of characteristics may include a first optical path that is optimized for reading the electronically displayed barcode. The second set of characteristics may include a second optical path that is optimized for reading the physically printed barcode.

24 Claims, 10 Drawing Sheets

BARCODE READER THAT READS ELECTRONICALLY DISPLAYED BARCODES DIFFERENTLY THAN PHYSICALLY PRINTED BARCODES

TECHNICAL FIELD

The present disclosure relates generally to barcodes and barcode readers.

BACKGROUND

A barcode is an optical machine-readable representation of data. Originally, barcodes represented data by varying the widths and spacings of parallel lines. These types of barcodes may be referred to as linear or one-dimensional (1D) barcodes. Later, barcodes evolved into rectangles, dots, hexagons and other geometric patterns in two dimensions (2D). Although 2D systems use a variety of symbols, they are generally referred to as barcodes as well. Devices for identifying or extracting information from barcodes are generally referred to as barcode readers.

Barcodes and barcode readers have a wide variety of uses. For example, almost every item from a grocery store, department store, or a mass merchandiser has a barcode on it. In addition, barcodes are widely used in the healthcare and hospital settings for patient identification, medication management, etc. Barcodes are used to keep track of rental cars, airline luggage, registered mail, express mail and parcels, etc. Barcoded tickets allow the holder to enter sports arenas, cinemas, theatres, fairgrounds, etc.

One type of barcode reader may be referred to as an image-based barcode reader. An image-based barcode reader may attempt to read a barcode by capturing an image of the barcode and then using image processing techniques to decode the barcode.

The process for using a conventional image-based barcode reader to read a barcode may be described generally as follows. The barcode to be read may be placed inside of a target area. Light sources within the barcode reader may provide illumination (which may be direct illumination) to the target area. Light may be reflected from the barcode toward the barcode reader. Lenses within the barcode reader may focus the reflected light onto an image sensor, which includes a relatively large number of light-sensitive photosensors that are arranged in horizontal rows and vertical columns. The photosensors may be allowed to accumulate charge for a certain amount of time. Read-out circuitry within the barcode reader may generate electronic signals that indicate the amount of charge that has accumulated on the photosensors of the image sensor. These signals may be digitized and amplified in order to provide a two-dimensional array of image data. Each element within this array may be referred to as a "pixel."

In an image-based barcode reader, the "exposure" is a measure of the amount of time that the photosensors within the image sensor are allowed to accumulate charge in order to capture an image. The "gain" is a measure of the amount by which the electronic signals that indicate the amount of charge that has accumulated on the photosensors of the image sensor are amplified.

In the context of an image that is produced by an image-based barcode reader, the term "resolution" refers to the amount of detail that the image includes. The term "field of view" refers to the size of the target area that is visible within the image. A first image may be said to have higher resolution than a second image if the first image includes more pixels for a smaller field of view than the second image. Higher-resolution images may be desirable for certain applications (e.g., for reading very small barcodes, such as those used in some manufacturing environments), but they may not be needed for others (e.g., for reading larger barcodes, such as those used in some retail point of sale environments). Lenses that produce high-resolution images may be referred to as high-resolution lenses (or high-resolution optics).

An image sensor may be configured to capture images using a "rolling shutter" technique or a "global shutter" technique. With a rolling shutter technique, an image is captured by scanning across the image either vertically or horizontally. In other words, not all parts of the image are captured at the same time. With a global shutter technique, the entire image is exposed for the same time window—i.e., all parts of the image are captured at the same time. An image sensor that produces images having a large field of view using a global shutter technique can be useful for reading fast moving barcodes.

An image of a barcode includes barcode elements and background elements. In a one-dimensional barcode, the barcode elements are vertical lines. In a two-dimensional barcode, the barcode elements may include a variety of different shapes and patterns.

DETAILED DESCRIPTION

Barcodes may be printed on a physical medium. However, it is becoming more common to use barcodes on electronic devices. For example, the ability to send secure, machine-readable information to a user's electronic device (e.g., smartphone, tablet computer, etc.) has resulted in applications such as electronic ticketing, digital coupons, and digital loyalty programs.

As used herein, the term "electronically displayed barcode" refers to a barcode that is displayed on an electronic device, such as a smartphone, tablet computer, laptop computer, personal computer, etc. The term "physically printed barcode" refers to a barcode that is printed on a physical medium, such as paper, metal, plastic, etc. Physically printed barcodes represent static data, and they may be designed once and printed multiple times using standard printing processes. In contrast, electronically displayed barcodes may be generated spontaneously and displayed on the display screen of an electronic device.

The optimal conditions for reading an electronically displayed barcode may be quite different than the optimal conditions for reading a physically printed barcode.

One potential difference relates to the amount of illumination that is utilized. In order to maximize the likelihood of successfully decoding a barcode (whether physically printed or electronically displayed) from an image of the barcode, it is desirable to maximize the contrast between the barcode elements and the background elements in the captured image.

As noted above, an image-based barcode reader may include light sources that provide direct illumination to a barcode. However, the same amount of illumination may not be required in order to read an electronically displayed barcode, because of the illumination from the display screen. In fact, in some situations, illumination may not be required at all in order to read an electronically displayed barcode. Moreover, an electronically displayed barcode may be displayed on a screen that is very reflective. Consequently, if direct illumination were used, it would be reflected back to the image sensor, thereby creating bright artifacts in the image and lowering the image contrast. Accordingly, indirect (i.e., low angle) illumination or no illumination at all allows the contrast to be maximized for reading an electronically displayed barcode. To compensate for the lack of direct illumination, the exposure and/or the gain may need to be increased.

Another potential difference relates to the fact that an electronically displayed barcode may be smaller and have a higher density than a physically printed barcode. In this situation, it may be desirable to utilize higher-resolution optics to read an electronically displayed barcode than a physically printed barcode.

Figure 1:
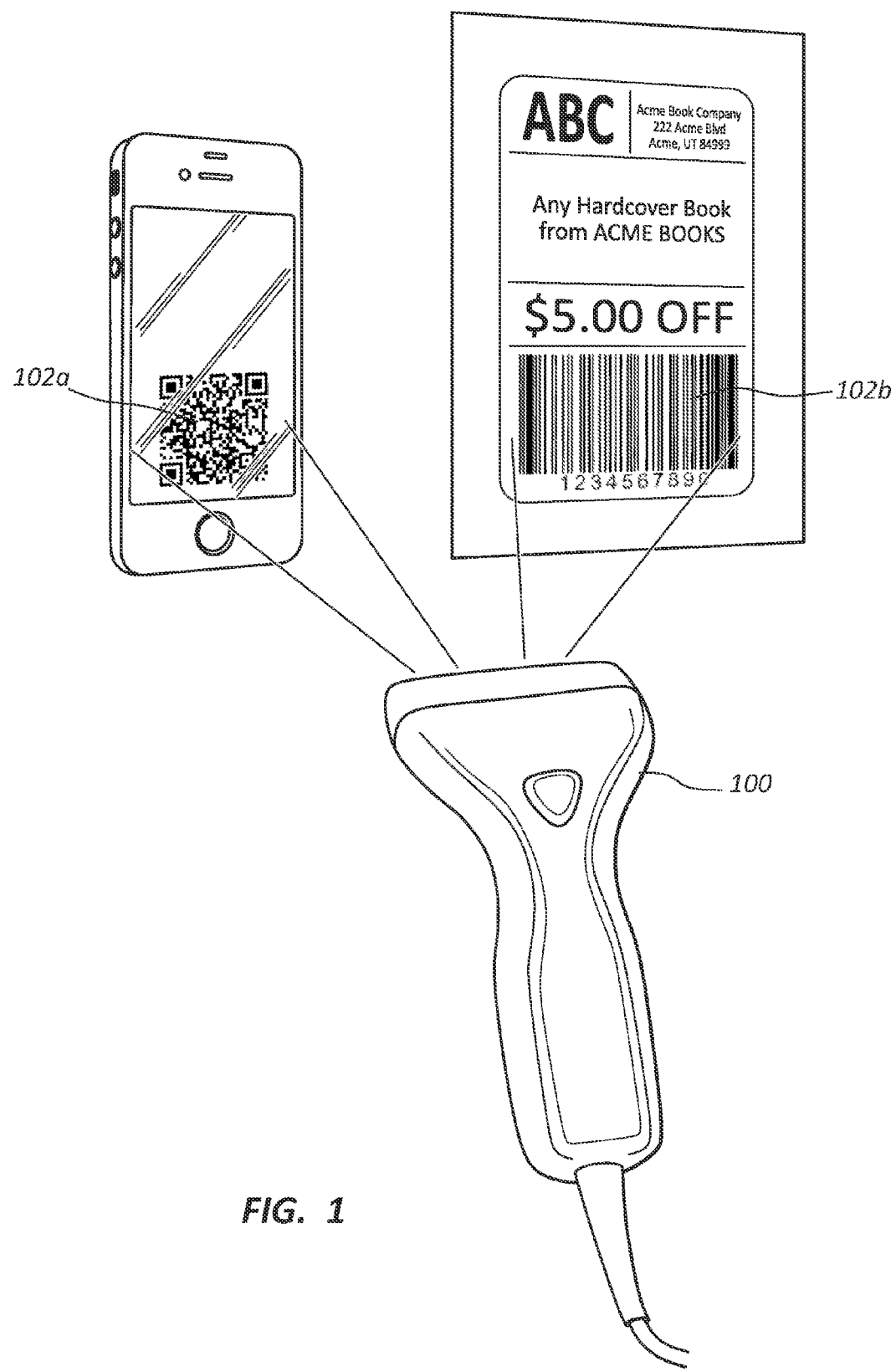
FIG. 1 illustrates certain aspects of a barcode reader in accordance with an embodiment of the invention.

The present disclosure relates generally to a barcode reader that reads electronically displayed barcodes differently than physically printed barcodes. FIG. 1 illustrates certain aspects of a barcode reader 100 in accordance with an embodiment of the invention. The barcode reader 100 includes a first set of characteristics that are optimized for reading an electronically displayed barcode 102a. The barcode reader 100 also includes a second set of characteristics that are optimized for reading a physically printed barcode 102b. As used herein, the term "set of characteristics" may refer to a single characteristic, or to multiple characteristics.

In FIG. 1, the electronically displayed barcode 102a is a two-dimensional barcode, and the physically printed barcode 102b is a one-dimensional barcode. Alternatively, the electronically displayed barcode 102a may be a one-dimensional barcode, and the physically printed barcode 102b may be a two-dimensional barcode.

Figure 2A:
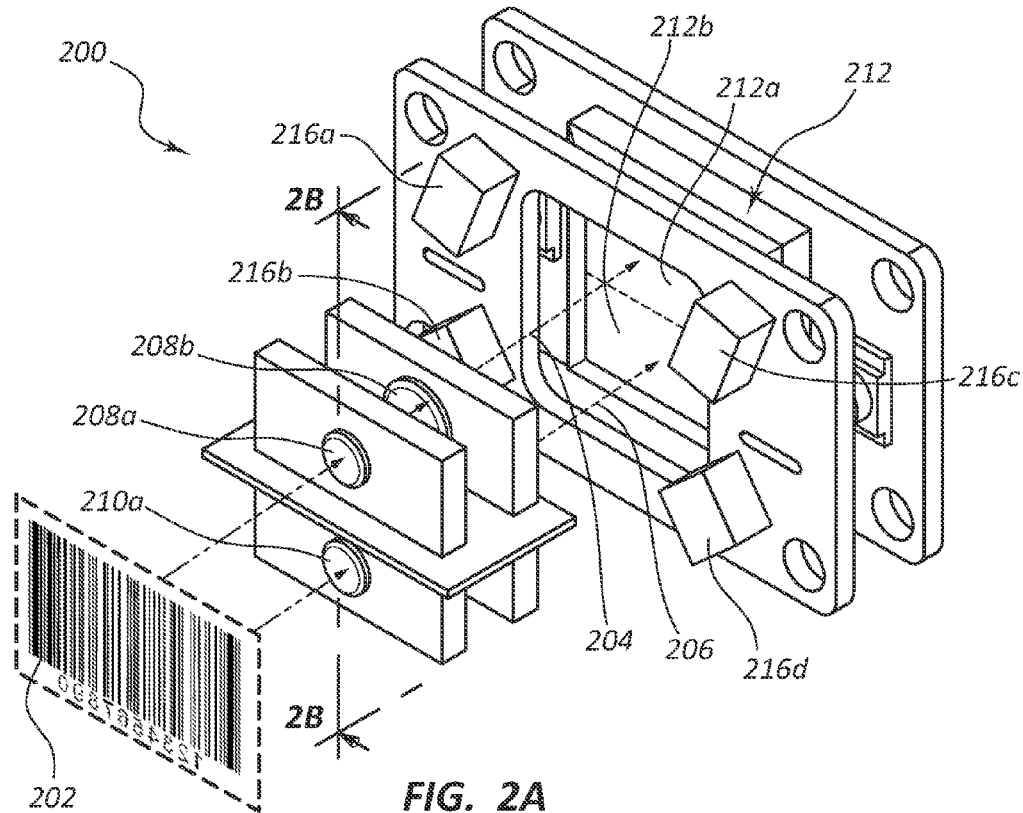
FIGS. 2A-2C illustrate certain aspects of another barcode reader in accordance with an embodiment of the invention.
Figure 2B:
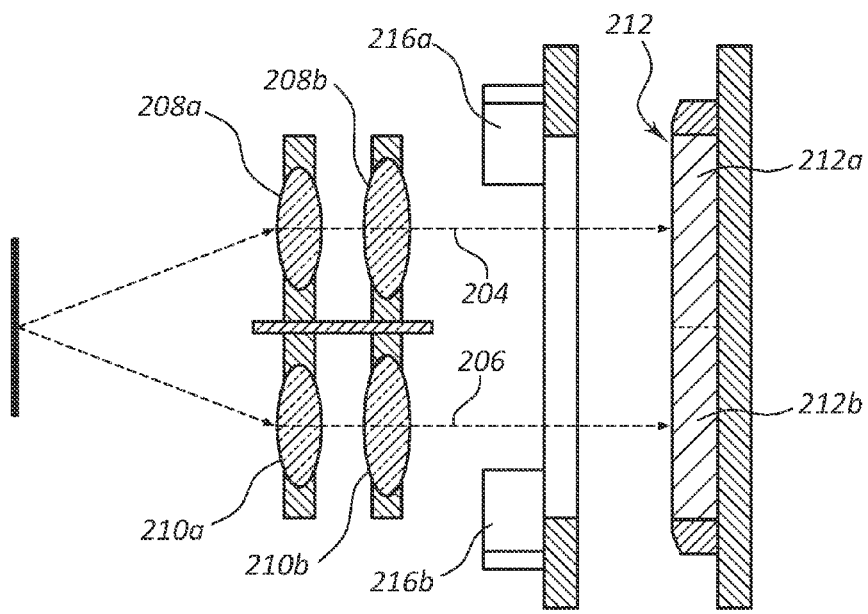
Figure 2C:
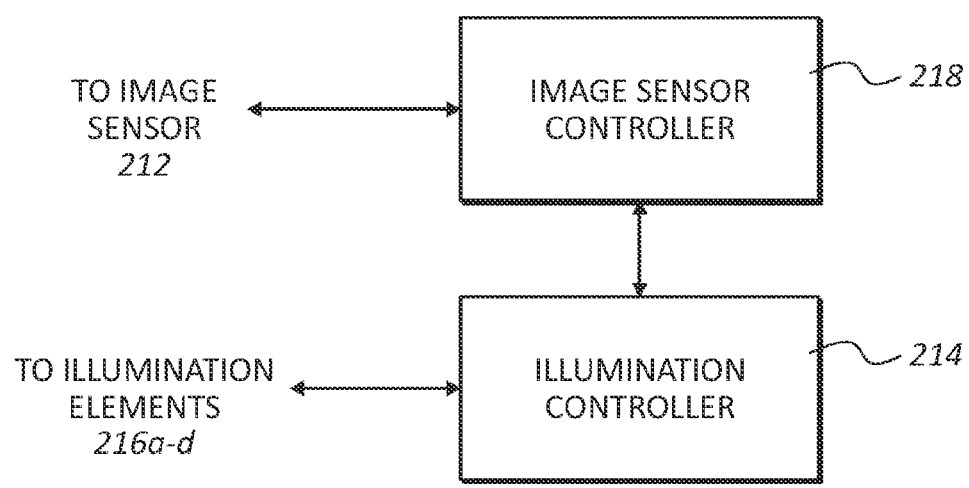

FIGS. 2A-2C illustrate aspects of another barcode reader 200 in accordance with an embodiment of the invention. More specifically, FIG. 2A illustrates a perspective view of certain components of the barcode reader 200. FIG. 2B illustrates a cross-sectional view of these components taken along line 2B in FIG. 2A. FIG. 2C is a block diagram that illustrates certain additional components of the barcode reader 200.

The barcode reader 200 is one possible implementation of the barcode reader 100 shown in FIG. 1. Therefore, the barcode reader 200 includes a first set of characteristics that are optimized for reading an electronically displayed barcode 102a, and a second set of characteristics that are optimized for reading a physically printed barcode 102b. The first set of characteristics includes a first optical path 204 that is optimized for reading an electronically displayed barcode 102a. The second set of characteristics includes a second optical path 206 that is optimized for reading a physically printed barcode 102b.

In the depicted embodiment, the first optical path 204 and the second optical path 206 are parallel to one another. However, in alternative embodiments, the optical paths 204, 206 may be partially parallel (see, e.g., FIGS. 3A-3B) or not parallel at all (see, e.g., FIGS. 4A-4B and 5A-5B).

The first optical path 204 includes lenses 208a-b, and the second optical path 206 includes lenses 210a-b. The number of lenses shown in the optical paths 204, 206 is for purposes of example only. Also, it is not necessary for the optical paths 204, 206 to include the same number of lenses.

The lenses 208a-b in the first optical path 204 may produce images that have a higher resolution and a smaller field of view than images produced by the lenses 210a-b in the second optical path 206. This may be one way in which the first optical path 204 is optimized for reading an electronically displayed barcode 102a, and the second optical path 206 is optimized for reading a physically printed barcode 102b. This is because an electronically displayed barcode 102a may be smaller and have a higher density than a physically printed barcode 102b, as mentioned above.

The barcode reader 200 includes an image sensor 212. The first optical path 204 includes a first portion 212a of the image sensor 212, and the second optical path 206 includes a second portion 212b of the image sensor 212. In the depicted embodiment, the first portion 212a of the image sensor 212 is the upper half of the image sensor 212, and the second portion 212b of the image sensor 212 is the lower half of the image sensor 212.

The reader 200 may be configured so that it provides less illumination for reading an electronically displayed barcode 102a than for reading a physically printed barcode 102b. In some configurations, the reader 200 may not provide any illumination for reading an electronically displayed barcode 102a. As indicated above, less illumination may be required to read an electronically displayed barcode 102a than to read a physically printed barcode 102b. Therefore, the fact that the reader 200 may provide less illumination for reading an electronically displayed barcode 102a than for reading a physically printed barcode 102b is an example of a characteristic of the reader 200 that is optimized for reading an electronically displayed barcode 102a.

As one example, the image sensor 212 may be a rolling shutter image sensor 212. The barcode reader 200 may include an illumination controller 214 and illumination elements 216a-d, which may be light-emitting diodes (LEDs). The illumination elements 216a-d may provide direct illumination to the barcode 202 that is being read. The illumination controller 214 may be configured so that it does not activate the illumination elements 216a-d when the first portion 212a of the rolling shutter image sensor 212 is being exposed. In addition, the illumination controller 214 may be configured so that it activates the illumination elements 216a-d when the second portion 212b of the rolling shutter image sensor 212 is being exposed. The illumination controller 214 may communicate with an image sensor controller 218 in order to determine which portion of the image sensor 212 is being exposed.

Alternatively, the barcode reader 200 may be configured so that it provides optimized illumination (instead of no illumination at all) for reading an electronically displayed barcode 102a. For example, the reader 200 may include additional illumination elements (not shown) that provide indirect illumination to the barcode 202 that is being read. The illumination controller 214 may be configured so that, when the first portion 212a of the rolling shutter image sensor 212 is being exposed, the illumination controller 214: (1) activates these additional illumination elements (not shown) that provide indirect illumination, and (2) does not activate the illumination elements 216a-d that provide direct illumination. In addition, the illumination controller 214 may be configured so that it activates the illumination elements 216a-d when the second portion 212b of the rolling shutter image sensor 212 is being exposed.

In one configuration, the first optical path 204 may include a larger aperture (not shown) than the second optical path 206. Also, the number of illumination elements 216a-d in the barcode reader 200 is for purposes of example only.

Figure 3A:
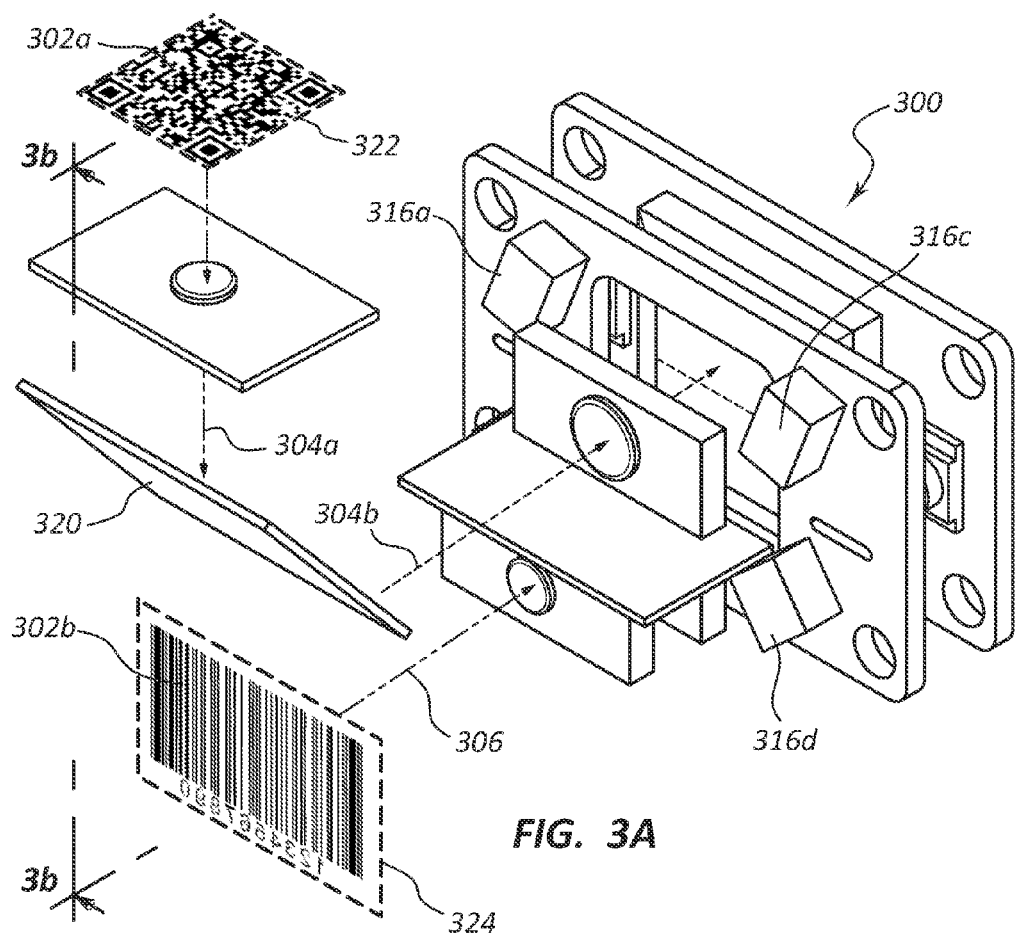
FIGS. 3A-3B illustrate certain aspects of another barcode reader in accordance with an embodiment of the invention.
Figure 3B:
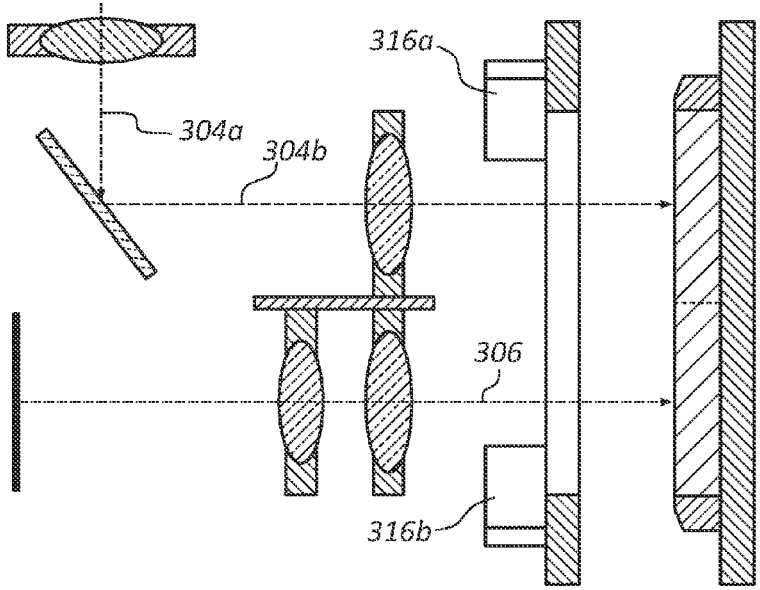

FIGS. 3A-3B illustrate aspects of another barcode reader 300 in accordance with an embodiment of the invention. More specifically, FIG. 3A illustrates a perspective view of certain components of the barcode reader 300. FIG. 3B illustrates a cross-sectional view of these components taken along line 3B in FIG. 3A.

The barcode reader 300 is another possible implementation of the barcode reader 100 shown in FIG. 1. Therefore, the barcode reader 300 includes a first set of characteristics that are optimized for reading an electronically displayed barcode 302a, and a second set of characteristics that are optimized for reading a physically printed barcode 302b. The first set of characteristics includes a first optical path 304 that is optimized for reading an electronically displayed barcode 302a. The second set of characteristics includes a second optical path 306 that is optimized for reading a physically printed barcode 302b.

The first optical path 304 and the second optical path 306 are partially parallel to one another. More specifically, the first optical path 304 includes a first portion 304a and a second portion 304b. The first portion 304a of the first optical path 304 is not parallel to the second optical path 306. The second portion 304b of the first optical path 304 is parallel to the second optical path 306. A mirror 320 reflects light from the first portion 304a of the first optical path 304 to the second portion 304b of the first optical path 304.

A first target area 322 corresponds to a field of view of the first optical path 304. In other words, when an electronically displayed barcode 302a needs to be read, a user may place the barcode 302a in the first target area 322. Similarly, a second target area 324 corresponds to a field of view of the second optical path 306.

The reader 300 may be configured so that it provides less illumination for reading an electronically displayed barcode 302a than for reading a physically printed barcode 302b. In some configurations, the reader 300 may not provide any illumination for reading an electronically displayed barcode 302a. As indicated above, less illumination may be required to read an electronically displayed barcode 302a than to read a physically printed barcode 302b. Therefore, the fact that the reader 300 may provide less illumination for reading an electronically displayed barcode 302a than for reading a physically printed barcode 302b is an example of a characteristic of the reader 300 that is optimized for reading an electronically displayed barcode 302a.

For example, the barcode reader 300 may not illuminate the first target area 322. Thus, the first optical path 304 may receive light generated by an electronic device in the first target area 322. The barcode reader 300 includes illumination elements 316a-d that illuminate the second target area 324. Thus, the second optical path 306 may receive light reflected from the second target area 324. Of course, the number of illumination elements 316a-d shown in FIG. 3 is for purposes of example only.

Figure 4A:
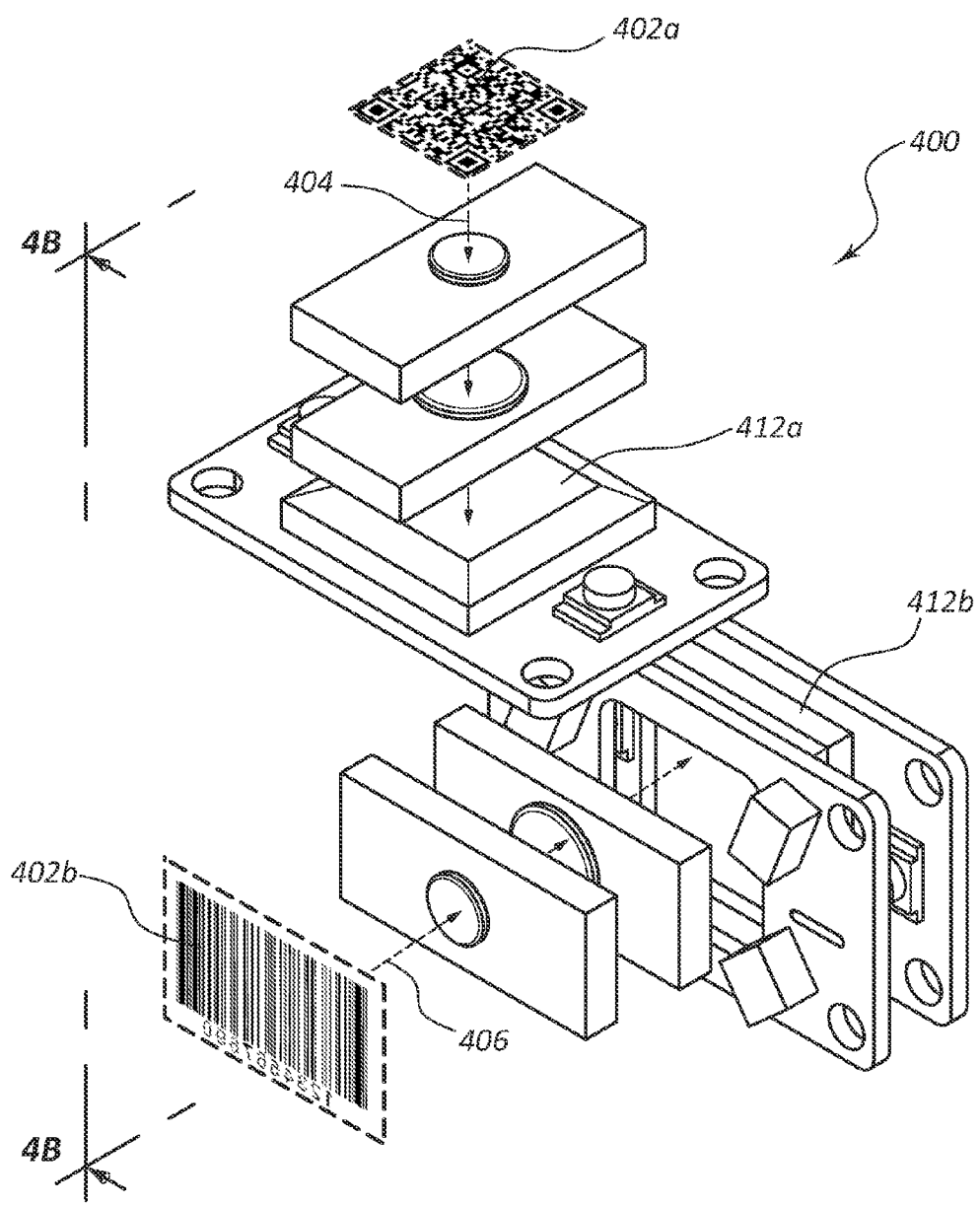
FIGS. 4A-4B illustrate aspects of another barcode reader in accordance with an embodiment of the invention.
Figure 4B:
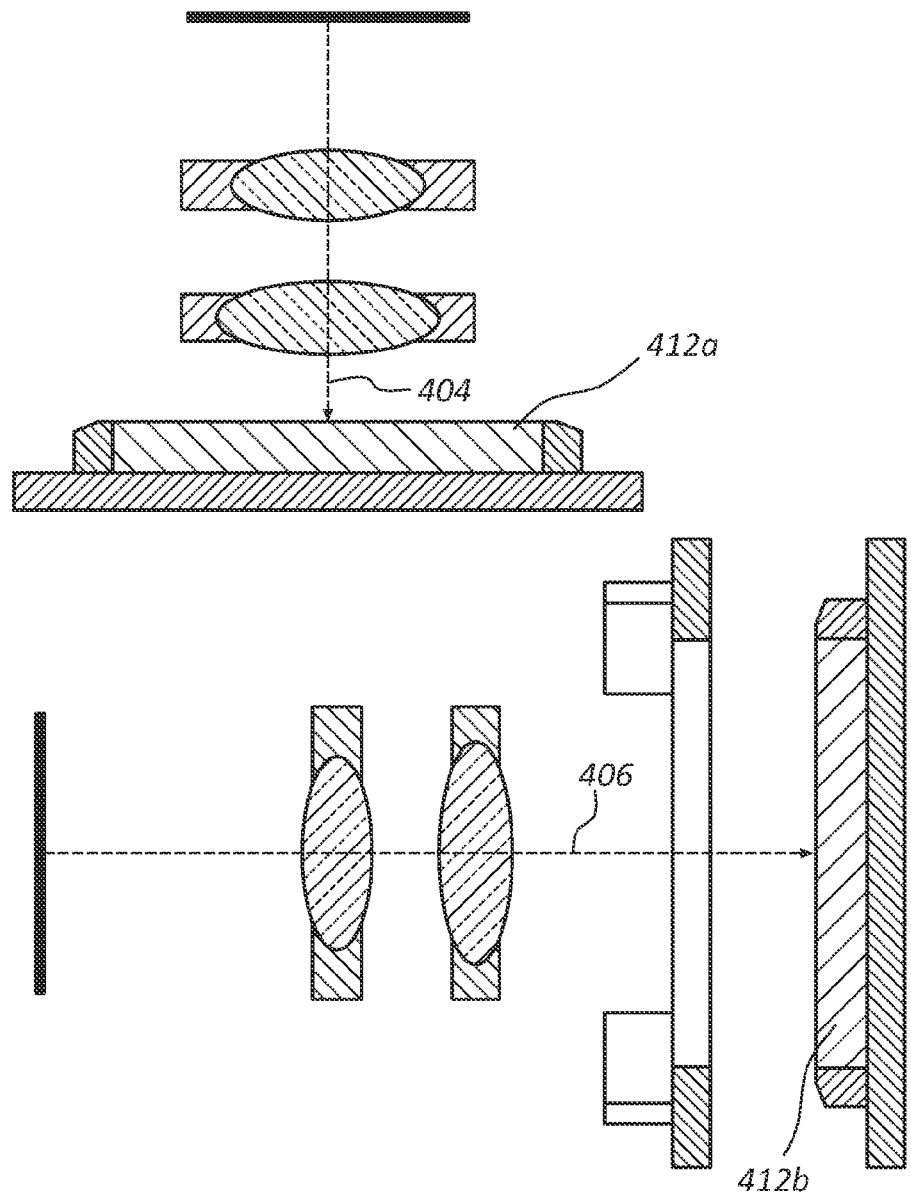

FIGS. 4A-4B illustrate aspects of another barcode reader 400 in accordance with an embodiment of the invention. More specifically, FIG. 4A illustrates a perspective view of certain components of the barcode reader 400. FIG. 4B illustrates a cross-sectional view of these components taken along line 4B in FIG. 4A.

The barcode reader 400 is another possible implementation of the barcode reader 100 shown in FIG. 1. Therefore, the barcode reader 400 includes a first set of characteristics that are optimized for reading an electronically displayed barcode 402a, and a second set of characteristics that are optimized for reading a physically printed barcode 402b. The first set of characteristics includes a first optical path 404 that is optimized for reading an electronically displayed barcode 402a. The second set of characteristics includes a second optical path 406 that is optimized for reading a physically printed barcode 402b.

The first optical path 404 and the second optical path 406 are not parallel to one another. Instead, they are perpendicular to one another. This type of configuration may be ergonomically advantageous in a retail environment. For example, the barcode reader 400 may be positioned so that the first optical path 404 is oriented in the direction of the customer, and so that the second optical path 406 is oriented in the direction of the cashier. The cashier may use the optical path 406 to read barcodes located on products that the customer is purchasing. In addition, without repositioning the barcode reader 400, the customer may use the optical path 404 to present coupons that may be stored on the customer's electronic device (e.g., smartphone, tablet computer, etc.), without the need to hand over the electronic device to the cashier.

As noted above, the optical paths 404, 406 may alternatively be parallel (or partially parallel) to one another. In yet an alternative embodiment, the optical paths 404, 406 may be neither parallel nor perpendicular to one another.

The first optical path 404 includes a first image sensor 412a, and the second optical path 406 includes a second image sensor 412b. The first image sensor 412a may be better suited for reading an electronically displayed barcode 402a than the second image sensor 412b. Conversely, the second image sensor 412b may be better suited for reading a physically printed barcode 402b than the first image sensor 412a.

For example, the first image sensor 412a may be a color image sensor, and the second image sensor 412b may be a grayscale image sensor. As another example, the first image sensor 412a may be a global shutter image sensor, and the second image sensor 412b may be a rolling shutter image sensor.

Figure 5A:
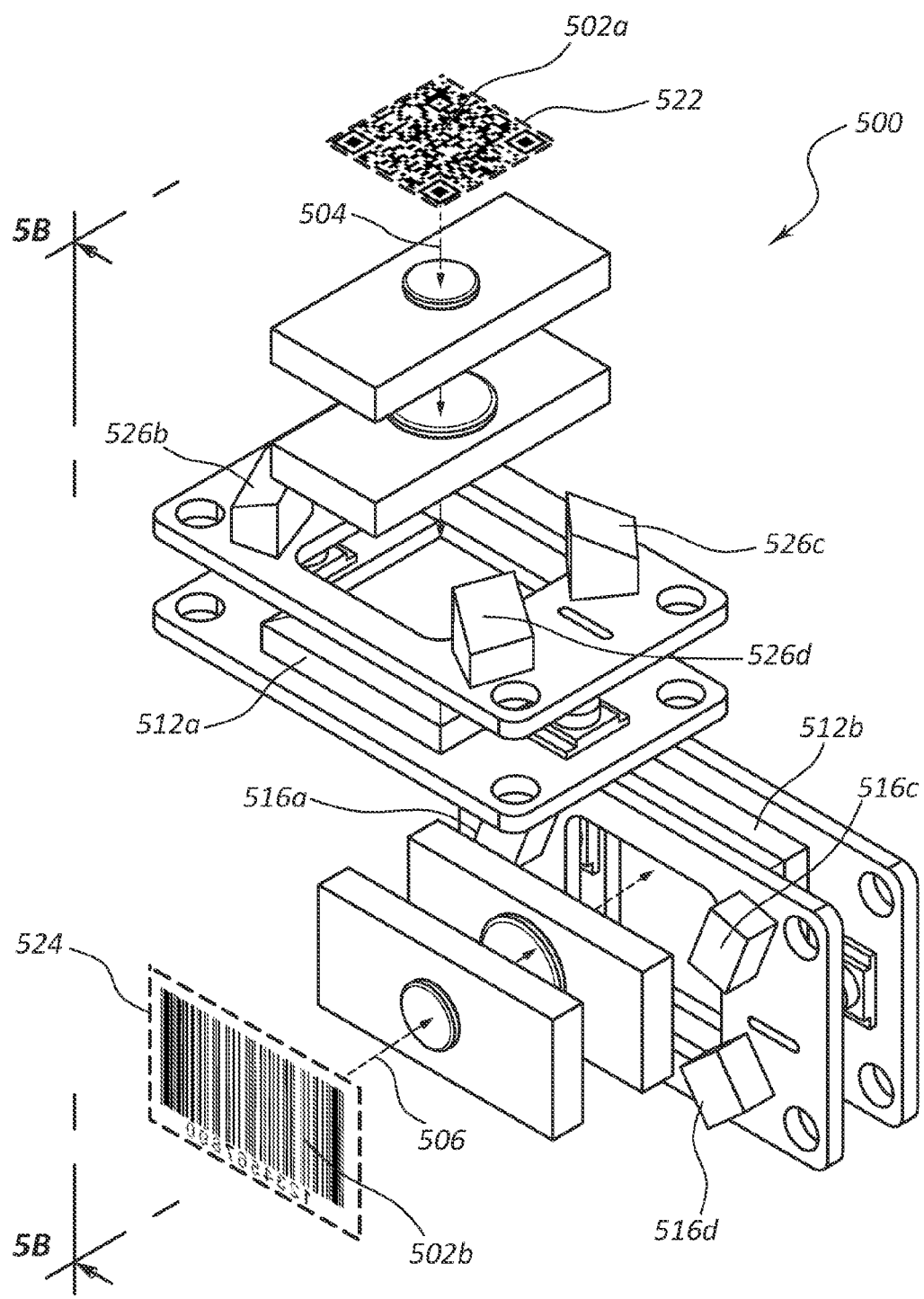
FIGS. 5A-5C illustrate aspects of another barcode reader in accordance with an embodiment of the invention.
Figure 5B:
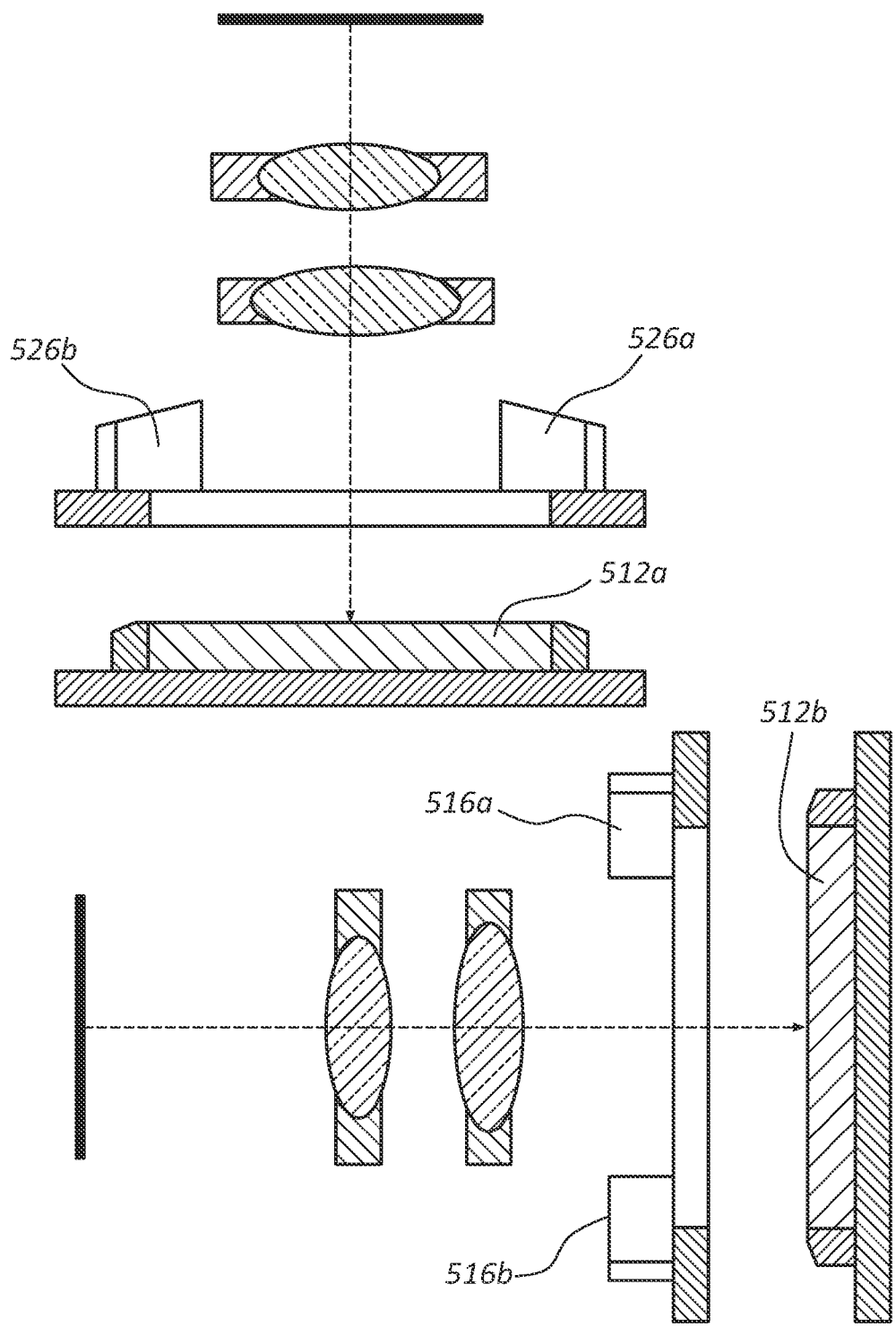
Figure 5C:
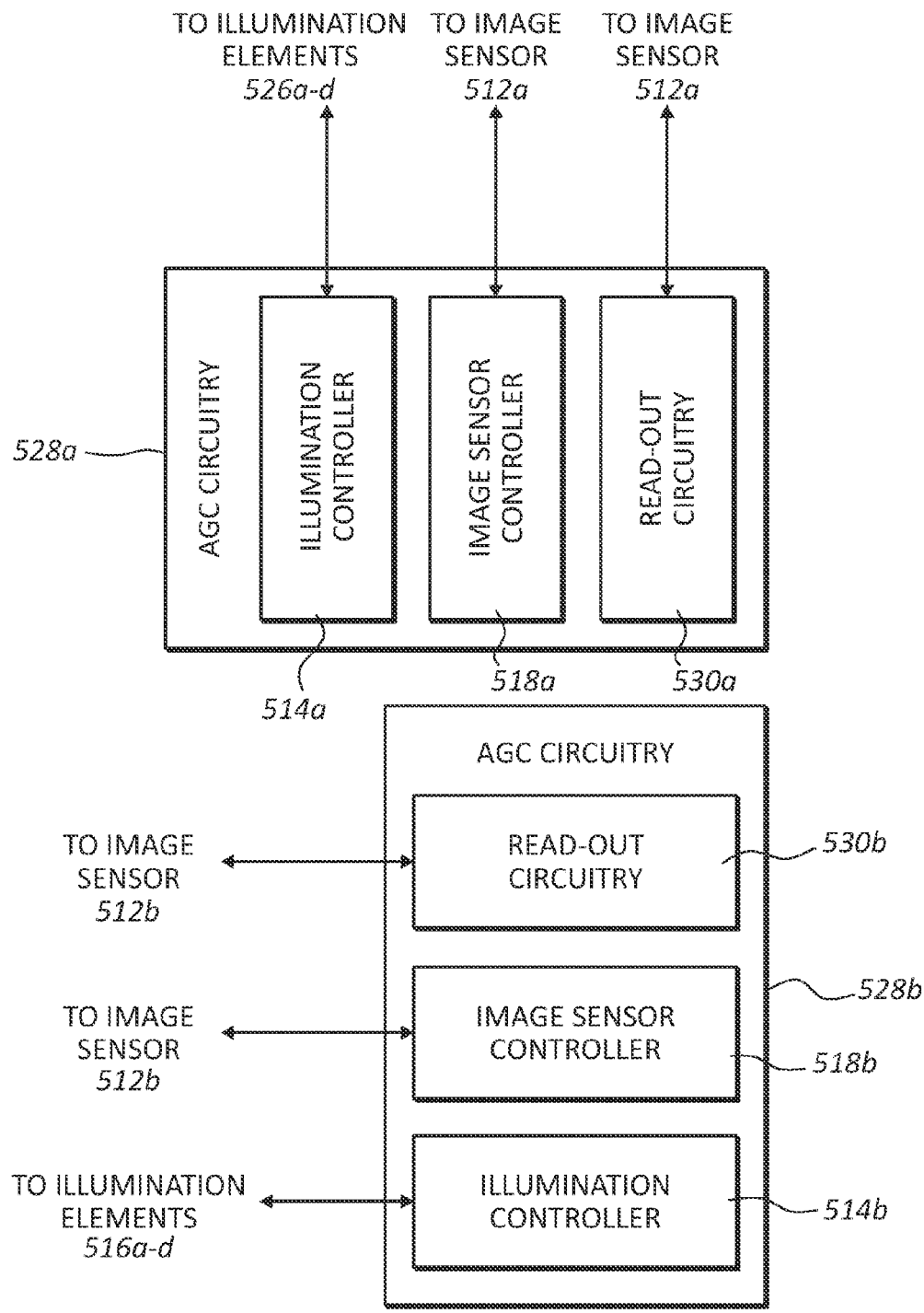

FIGS. 5A-5C illustrate aspects of another barcode reader 500 in accordance with an embodiment of the invention. More specifically, FIG. 5A illustrates a perspective view of certain components of the barcode reader 500. FIG. 5B illustrates a cross-sectional view of these components taken along line 5B in FIG. 5A. FIG. 5C is a block diagram that illustrates certain additional components of the barcode reader 500.

The barcode reader 500 is another possible implementation of the barcode reader 100 shown in FIG. 1. Therefore, the barcode reader 500 includes a first set of characteristics that are optimized for reading an electronically displayed barcode 502a, and a second set of characteristics that are optimized for reading a physically printed barcode 502b. The first set of characteristics includes a first optical path 504 that is optimized for reading an electronically displayed barcode 502a. The second set of characteristics includes a second optical path 506 that is optimized for reading a physically printed barcode 502b.

The reader 500 may be configured so that it provides indirect illumination for reading an electronically displayed barcode 502a. This is an example of a characteristic of the reader 500 that is optimized for reading an electronically displayed barcode 502a.

Conversely, the reader 500 may be configured so that it provides direct illumination for reading a physically printed barcode 502b. This is an example of a characteristic of the reader 500 that is optimized for reading a physically printed barcode 502b.

More specifically, the first optical path 504 receives light that is reflected from a first target area 522 and/or generated by an electronic device in the first target area 522. The second optical path 506 receives light reflected from a second target area 524. The barcode reader 500 includes illumination elements 526a-d that are angled with respect to the first target area 522, so that the illumination elements 526a-d provide indirect illumination to the first target area 522. The barcode reader 500 also includes illumination elements 516a-d that are aimed directly at the second target area 524, so that the illumination elements 516a-d provide direct illumination to the second target area 524. Of course, the number of illumination elements 516a-d, 526a-d shown in FIGS. 5A-5B is for purposes of example only.

The characteristics of the reader 500 that are optimized for reading an electronically displayed barcode 502a include automatic gain control (AGC) circuitry 528a that is optimized for reading an electronically displayed barcode 502a. The characteristics of the reader 500 that are optimized for reading a physically printed barcode 502b include AGC circuitry 528b that is optimized for reading a physically printed barcode 502b. The AGC circuitry 528a may be independent of the AGC circuitry 528b.

The AGC circuitry 528a controls the gain, exposure and illumination for the first optical path 504. The AGC circuitry 528a includes read-out circuitry 530a, an image sensor controller 518a, and an illumination controller 514a. The AGC circuitry 528b controls the gain, exposure and illumination for the second optical path 506. The AGC circuitry 528b includes read-out circuitry 530b, an image sensor controller 518b, and an illumination controller 514b.

Having the AGC circuitry 528a for the first optical path 504 be independent of the AGC circuitry 528b for the second optical path 506 permits the gain, exposure and illumination for the first optical path 504 to be independent of the gain, exposure and illumination for the second optical path 506. Therefore, the gain, exposure and illumination for the first optical path 504 can be optimized for reading an electronically displayed barcode 502a, and the gain, exposure and illumination for the second optical path 506 can be optimized for reading a physically printed barcode 502b. For example, less illumination may be provided for reading an electronically displayed barcode 502a than for reading a physically printed barcode 502b. As another example, the gain and exposure may be higher for reading an electronically displayed barcode 502a than for reading a physically printed barcode 502b.

Figure 6:
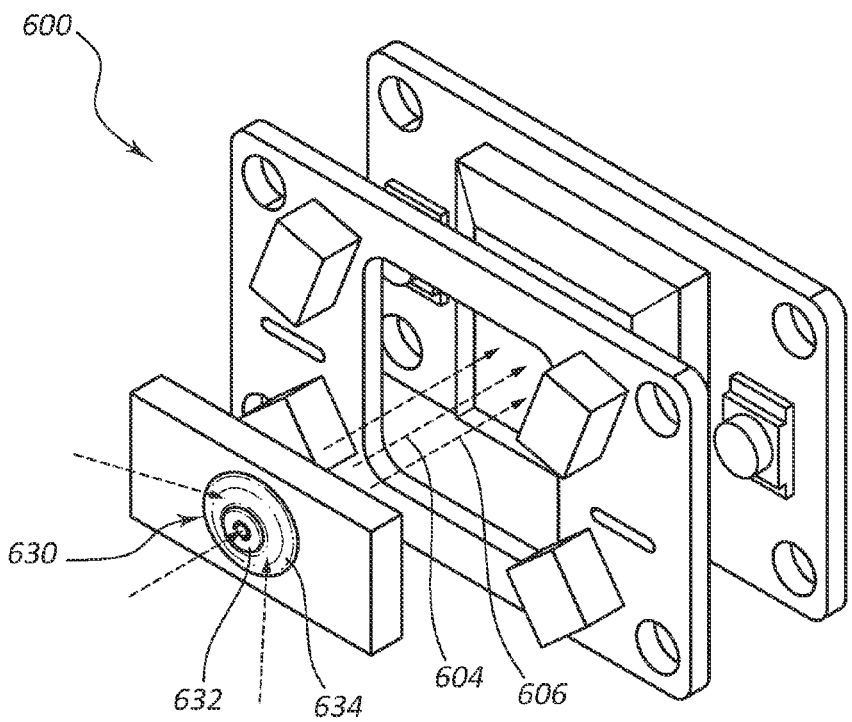
FIG. 6 illustrates aspects of another barcode reader in accordance with an embodiment of the invention.

FIG. 6 illustrates aspects of another barcode reader 600 in accordance with an embodiment of the invention. The barcode reader 600 is another possible implementation of the barcode reader 100 shown in FIG. 1. Therefore, the barcode reader 600 includes a first set of characteristics that are optimized for reading an electronically displayed barcode 102a, and a second set of characteristics that are optimized for reading a physically printed barcode 102b. The first set of characteristics includes a first optical path 604 that is optimized for reading an electronically displayed barcode 102a. The second set of characteristics includes a second optical path 606 that is optimized for reading a physically printed barcode 102b.

The barcode reader 600 includes a lens 630. The lens 630 includes a first optical surface 632 and a second optical surface 634. The first optical path 604 includes the first optical surface 632 of the lens 630. The second optical path 606 includes the second optical surface 634 of the lens 630. In the depicted embodiment, the first optical surface 632 is in the center of the lens 630. The second optical surface 634 is located around the perimeter of the lens 630, and it is in the shape of a toroid. The characteristics of the second optical surface 634 may be similar to a fisheye lens.

Figure 7:
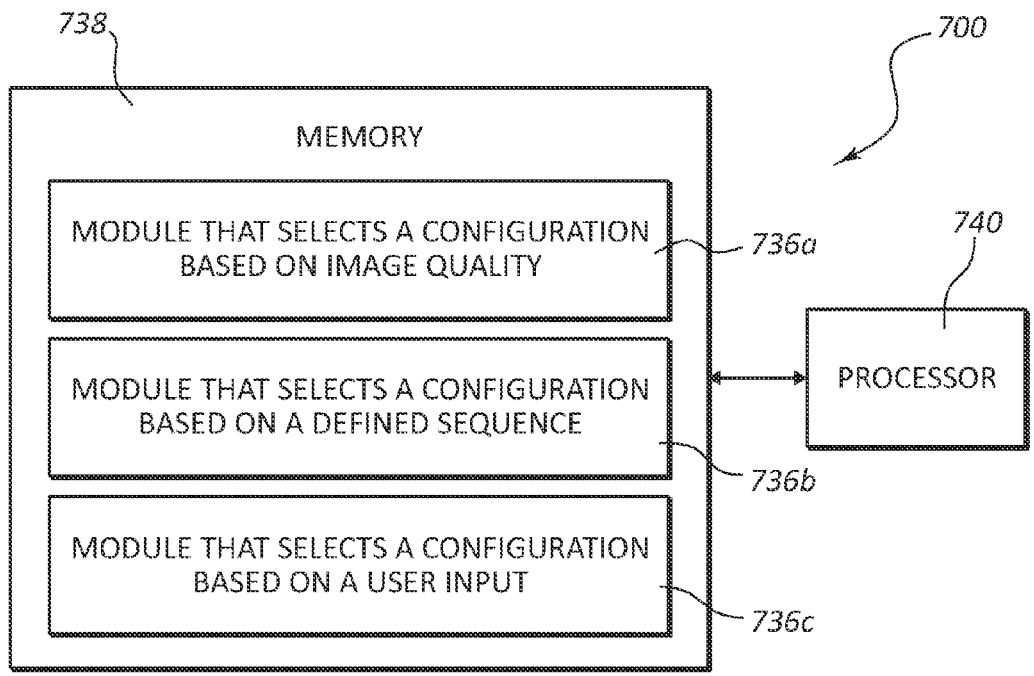
FIG. 7 illustrates aspects of another barcode reader in accordance with an embodiment of the invention.

FIG. 7 illustrates aspects of another barcode reader 700 in accordance with an embodiment of the invention. The barcode reader 700 is another possible implementation of the barcode reader 100 shown in FIG. 1. Therefore, the barcode reader 700 includes a first set of characteristics that are optimized for reading an electronically displayed barcode 102a, and a second set of characteristics that are optimized for reading a physically printed barcode 102b. In the depicted embodiment, the first set of characteristics includes a first configuration that is optimized for reading an electronically displayed barcode 102a, and the second set of characteristics includes a second configuration that is optimized for reading a physically printed barcode 102b. As used herein, the term "configuration" refers to one or more settings for a barcode reader 700, such as settings for gain, exposure, illumination, etc. Therefore, the first configuration may include one or more gain settings, exposure settings, and illumination settings that are optimized for reading an electronically displayed barcode 102a. In other words, the AGC in the first configuration may be designed to maximize the image quality of an electronically displayed barcode 102a. Conversely, the second configuration may include one or more gain settings, exposure settings, and illumination settings that are optimized for reading a physically printed barcode 102b. In other words, the AGC in the second configuration may be designed to maximize the image quality of a physically printed barcode 102b.

The barcode reader 700 may be configured to select between the first configuration that is optimized for reading an electronically displayed barcode 102a and the second configuration that is optimized for reading a physically printed barcode 102b. This selection may be made based on comparing the quality of a first image of a barcode that is captured using the first configuration and the quality of a second image of the barcode that is captured using the second configuration.

More specifically, two images of the same barcode may be captured sequentially. The first image may be captured using the first configuration. The second image may be captured using the second configuration. As noted above, the AGC in the first configuration may be designed to maximize the image quality of an electronically displayed barcode 102a, and the AGC in the second configuration may be designed to maximize the image quality of a physically printed barcode 102b. The quality of the first image may be compared to the quality of the second image, and the image that has better quality may be used for decoding. In other words, the first configuration may be selected if the first image has better quality, and the second configuration may be selected if the second image has better quality. If decoding is unsuccessful, another pair of images may be captured using the first configuration and the second configuration, respectively.

Alternatively, or in addition, the selection of the first configuration that is optimized for reading an electronically displayed barcode 102a or the second configuration that is optimized for reading a physically printed barcode 102b may be based on a defined sequence.

Alternatively, or in addition, the selection of the first configuration that is optimized for reading an electronically displayed barcode 102a or the second configuration that is optimized for reading a physically printed barcode 102b may be based on user input.

The functions of the barcode reader 700 that were described above may be implemented in software and/or firmware via modules 736a-c stored in memory 738 and executed by one or more processors 740. Alternatively, these functions may be implemented, either partially or wholly, in hardware (e.g., via an application specific integrated circuit, a field programmable gate array, etc.).

Accordingly, a barcode reader that reads electronically displayed barcodes differently than physically printed barcodes has been disclosed. A barcode reader in accordance with the present disclosure may include a first set of characteristics that are optimized for reading an electronically displayed barcode, and a second set of characteristics that are optimized for reading a physically printed barcode. Several examples of characteristics that are optimized for reading an electronically displayed barcode and characteristics that are optimized for reading a physically printed barcode have been disclosed.

Of course, it is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A barcode reader, comprising:
   a first optical path, comprising a first optical surface of a lens, optimized for reading an electronically displayed barcode; and
   a second optical path, comprising a second optical surface of a lens, optimized for reading a physically printed barcode.

2. The barcode reader of claim 1, wherein the first optical path and the second optical path are parallel to one another.

3. The barcode reader of claim 1, wherein the first optical path and the second optical path are partially parallel to one another.

4. The barcode reader of claim 1, wherein the first optical path and the second optical path are not parallel to one another.

5. The barcode reader of claim 1, wherein:
   the first optical path comprises a first lens;
   the second optical path comprises a second lens; and
   images produced by the first lens have a higher resolution and a smaller field of view than images produced by the second lens.

6. The barcode reader of claim 1, wherein:
   the barcode reader comprises an image sensor;
   the first optical path comprises a first portion of the image sensor; and
   the second optical path comprises a second portion of the image sensor.

7. The barcode reader of claim 1, wherein:
   the first optical path comprises a first image sensor; and
   the second optical path comprises a second image sensor.

8. The barcode reader of claim 7, wherein:
   the first image sensor comprises at least one of a color image sensor and a global shutter image sensor; and
   the second image sensor comprises at least one of a grayscale image sensor and a rolling shutter image sensor.

9. A barcode reader, comprising:
   a first optical path comprising a first portion of a rolling shutter image sensor;
   a second optical path comprising a second portion of the rolling shutter image sensor;
   an illumination element; and
   an illumination controller, wherein the illumination controller does not activate the illumination element when the first portion of the rolling shutter image sensor is being exposed, and wherein the illumination controller activates the illumination element when the second portion of the rolling shutter image sensor is being exposed.

10. The barcode reader of claim 9, wherein the first optical path and the second optical path are parallel to one another.

11. The barcode reader of claim 9, wherein the first optical path and the second optical path are partially parallel to one another.

12. The barcode reader of claim 9, wherein the first optical path and the second optical path are not parallel to one another.

13. The barcode reader of claim 9, wherein:
   the first optical path receives light reflected or generated from a first target area;
   the second optical path receives light reflected from a second target area;
   the barcode reader does not illuminate the first target area; and
   the barcode reader comprises an illumination element that illuminates the second target area.

14. A barcode reader, comprising:
   a first optical path receiving light reflected or generated from a first target area;
   a second optical path receiving light reflected from a second target area;
   a first illumination element that is angled with respect to the first target area; and
   a second illumination element that is aimed directly at the second target area.

15. The barcode reader of claim 14, wherein the first optical path and the second optical path are parallel to one another.

16. The barcode reader of claim 14, wherein the first optical path and the second optical path are partially parallel to one another.

17. The barcode reader of claim 14, wherein the first optical path and the second optical path are not parallel to one another.

18. A barcode reader, comprising:
   a first optical path comprising first automatic gain control circuitry that is optimized for reading an electronically displayed barcode; and
   a second optical path comprising second automatic gain control circuitry that is optimized for reading a physically printed barcode;
   wherein the first automatic gain control circuitry is independent of the second automatic gain control circuitry.

19. A barcode reader, comprising:
   a first optical path comprising a first configuration that is optimized for reading an electronically displayed barcode; and
   a second optical path comprising a second configuration that is optimized for reading a physically printed barcode;
   wherein the barcode reader selects between the first configuration that is optimized for reading the electronically displayed barcode and the second configuration that is optimized for reading the physically printed barcode based on comparing the quality of a first image of a barcode that is captured using the first configuration and the quality of a second image of the barcode that is captured using the second configuration.

20. The barcode reader of claim 19, wherein the barcode reader selects between the first configuration that is optimized for reading the electronically displayed barcode and the second configuration that is optimized for reading the physically printed barcode based on a defined sequence.

21. The barcode reader of claim 19, wherein the barcode reader selects between the first configuration that is optimized for reading the electronically displayed barcode and the second configuration that is optimized for reading the physically printed barcode based on user input.

22. The barcode reader of claim 19, wherein the first optical path and the second optical path are parallel to one another.

23. The barcode reader of claim 19, wherein the first optical path and the second optical path are partially parallel to one another.

24. The barcode reader of claim 19, wherein the first optical path and the second optical path are not parallel to one another.

* * * * *